United States Patent
Tawfik et al.

(10) Patent No.: US 8,891,850 B2
(45) Date of Patent: Nov. 18, 2014

(54) SYSTEM AND METHODS FOR DIGITAL EVALUATION OF CELLBLOCK PREPARATIONS

(75) Inventors: Ossama Tawfik, Leawood, KS (US); Brian Potetz, Lawrence, KS (US)

(73) Assignee: The University of Kansas, Lawrence, KS (US)

( * ) Notice: Subject to any disclaimer, the term of this patent is extended or adjusted under 35 U.S.C. 154(b) by 408 days.

(21) Appl. No.: 13/234,790

(22) Filed: Sep. 16, 2011

(65) Prior Publication Data

US 2012/0237107 A1    Sep. 20, 2012

Related U.S. Application Data

(60) Provisional application No. 61/383,466, filed on Sep. 16, 2010.

(51) Int. Cl.
G06K 9/00    (2006.01)

(52) U.S. Cl.
CPC .................................. *G06K 9/00127* (2013.01)
USPC ............................ 382/133; 382/134; 382/128

(58) Field of Classification Search
None
See application file for complete search history.

(56) References Cited

U.S. PATENT DOCUMENTS

| | | | |
|---|---|---|---|
| 4,523,278 A | 6/1985 | Reinhardt et al. | |
| 5,556,764 A * | 9/1996 | Sizto et al. | 435/7.24 |
| 5,933,519 A * | 8/1999 | Lee et al. | 382/133 |
| 6,934,637 B2 * | 8/2005 | Murphey | 702/19 |
| 7,463,761 B2 | 12/2008 | Eichhorn et al. | |
| 7,738,699 B2 | 6/2010 | Tsuruoka et al. | |
| 7,756,305 B2 | 7/2010 | Price | |
| 7,949,181 B2 * | 5/2011 | Padfield et al. | 382/164 |
| 2003/0170703 A1 * | 9/2003 | Piper et al. | 435/6 |
| 2006/0064248 A1 * | 3/2006 | Saidi et al. | 702/19 |
| 2007/0086672 A1 * | 4/2007 | Zeng et al. | 382/261 |
| 2008/0232669 A1 * | 9/2008 | Piper et al. | 382/133 |
| 2009/0003691 A1 * | 1/2009 | Padfield et al. | 382/164 |
| 2009/0112882 A1 | 4/2009 | Maresh et al. | |
| 2009/0169074 A1 * | 7/2009 | Avinash et al. | 382/128 |

OTHER PUBLICATIONS

Digital Pathology, Wikipedia, Aug. 21, 2012. Link: http://en.wikipedia.org/wiki/Digital_pathology.
We are Hologic, Hologic The Women's Health Company, 2012. Link: http://www.hologic.com/en/about-hologic/hologic-story/.
Cellient automated cellblock system: More consistency, clarity, and cellularity from every block, The Thin Prep Pap Test, 2010, Hologic Inc. Link: http://www.thinprep.com/hcp/lab_professionals/thinprep_non_gyn/cellient_block_system.html.
Witkoski, Aperio's SecondSlide Digital Slide Sharing Service Included in College of American Pathologists Diagnostic Work Station Prototype, Aperio Technologies, Oct. 9, 2009. Link: http://www.aperio.com/newsevents/press-release-100909-aperio-secondslide-sharing-service-in-american-pathologists-diagnostic-station-prototype.asp.
Internet web site http://blog.aperio.com—Web site which appears to disclose at least some portion of the inventor's invention in Sep. 2009 Link: http://blog.aperio.com/2009/09/visions-of-visions-2009.html.

(Continued)

*Primary Examiner* — Avinash J Yentrapati
(74) *Attorney, Agent, or Firm* — Valauskas Corder LLC

(57) ABSTRACT

Digital evaluation of cellblock preparations to determine the type and extent of disease in order to identify the best approach for treatment without the need for additional testing or sampling.

20 Claims, 5 Drawing Sheets

(56) References Cited

OTHER PUBLICATIONS

Afify et al., The diagnostic utility of cellblocks prepared from residual SurePath Pap Material for detection of human papilloma virus, Applied Immunohistochemistry & Molecular Morphology, Mar. 2009, vol. 17, Iss. 12, p. 108-114. Link: http://journals.lww.com/appliedimmunohist/Abstract/2009/03000/The_Diagnostic_Utility_of_Cell_Blocks_Prepared.4.aspx.

Afify et al., The diagnostic utility of cell blocks prepared from residual SurePath PAP material for detection of the human papilloma virus, NCBI, Appl Immunohistochem Mol Morphol. Mar. 17, 2009, vol. 2, p. 108-14, Medknow Publications. Link: http://www.ncbi.nlm.nih.gov/pubmed/18971783.

Pantanowitz et al., The impact of digital imaging in the field of cytopathology, CytoJournal, Mar. 6, 2009, Medknow Publications. Link: http://www.ncbi.nlm.nih.gov/pmc/articles/PMC2678829/.

Min En Nga et al., Successful retrieval of fine-needle biopsy material from previously stained smears for immunocytochemistry: a novel technique applied to three soft tissue tumors, Modern Pathology, 2005, vol. 18, p. 728-732, Advance only publication. Link: http://www.nature.com/modpathol/journal/v18/n5/full/3800356a.html.

Crisp et al., Fast Segmentation of Large Images, Intelligencec, Surveillance & Reconnaissance Division. Defense Science & Technology Organisation, South Australia, 2003. Link: http://crpit.com/confpapers/CRPITV16Crisp.pdf.

* cited by examiner

SYSTEM AND METHODS FOR DIGITAL EVALUATION OF CELLBLOCK PREPARATIONS

This application claims the benefit of U.S. Provisional Patent Application No. 61/383,466 filed Sep. 16, 2010.

FIELD OF THE INVENTION

The present invention relates generally to pathology including cytopathology. Pathology relates to the study and diagnosis of disease generally and cytopathology relates to the study and diagnosis of disease specifically through the identification of cellular features. More particularly, the present invention relates to an automated process for evaluating cellblock preparations through telecytology, which is the use of digital images rather than conventional glass slide microscopy.

BACKGROUND OF THE INVENTION

Pathologists examine specimens—otherwise referred to herein as samples—to determine the type and extent of disease in order to identify the best approach for treatment. With improvements in pathological procedures, cellular features of diseases may be identified in specimens to make diagnoses based on only a few cells.

Typically, specimens are examined using a light microscope in order to diagnose or detect disease. The specimen is retrieved from a patient and processed for microscopic examination. A variety of minimally invasive techniques are available for retrieving cell sample specimens from a patient. For example, specimens may be retrieved by using fine needle aspiration or by brushing body cavity surfaces such as through endoscopic techniques. After the specimens are retrieved, the cells are prepared for evaluation. A number of preparation techniques are known—such as the Cytospin® technique and the ThinPrep® technique—for depositing cellular materials and/or tissue fragments onto a microscope slide. Another technique, commonly referred to as a cellblock preparation, isolates and immobilizes cellular materials and/or small tissue fragments. Cellular materials and/or small tissue fragments may be isolated using centrifugation and/or manually embedded within a solid support structure such as paraffin wax. Thin sections of the cellblock are then cut and placed or secured onto a microscope slide—a thin flat piece of glass—for examination under a microscope. Microscope slides are often used together with a cover slip or cover glass—a thinner flat piece of glass—that is placed over the specimen. Slides may be held in place on the stage of the microscope by slide clips or slide clamps.

Cervical cancer is just one type of disease that is detected or diagnosed through the examination of specimens. Although the invention is discussed herein with respect to cervical cancer, any disease is contemplated. In the 1930s, cervical cancer was the most common cause of cancer deaths in women in the United States. Today, cervical cancer is not even in the top ten. The significant decline in both the incidence and mortality of cervical cancer is attributed to the Papanicolaou test, or Pap test—also called Pap smear, cervical smear, or smear test—, which is a screening test used in gynecology to detect premalignant and malignant cells in the ectocervix and endocervix.

The Pap smear has been proven to be the most useful test for the detection of precancerous and cancerous lesions of the cervix. It is estimated that over 3.5 million women in the United States each year have an abnormal Pap smear. The Bethesda System ("TBS") is a system for reporting Pap smear results. Abnormal results include Atypical Squamous Cells of Undetermined Significance ("ASC-US") and Atypical Squamous Cells—Cannot Exclude High Grade Squamous Intraepithelial Lesion ("ASC-H"). Abnormal results further include Low Grade Squamous Intraepithelial Lesion ("LGSIL"), High Grade Squamous Intraepithelial Lesion ("HGSIL"), Squamous cell carcinoma, Atypical Glandular Cells Not Otherwise Specified ("AGC-NOS"), Atypical Glandular Cells, Suspicious for AIS or Cancer ("AGC-neoplastic"), and Adenocarcinoma in situ ("AIS"). LGSIL indicates mild dysplasia ("CIN 1") including that caused by a Human Papillomavirus ("HPV") infection. HGSIL indicates moderate dysplasia ("CIN 2") or severe dysplasia ("CIN 3") and may include carcinoma in situ as well as features suspicious for invasion, glandular cell including atypical such as endocervical cells, endometrial cells, glandular cells, endocervical cells favor neoplastic, glandular cells favor neoplastic, or adenocarcinoma in situ or adenocarcinoma (Endocervical, Endometrial, Extrauterine, Not otherwise specified).

Current techniques for obtaining Pap test samples include the conventional smear and the more recently preferred liquid-based procedures. The conventional smears are often obtained using a combination of a plastic spatula, brush or a broom-like brush in which the tissue surface is scraped. The cells obtained require immediate coating fixation with ethanol and polyethylene followed by submersion in 95% ethanol to prevent air-drying artifact that may interfere with appropriate evaluation of the samples.

Poor sensitivity of the conventional smears became apparent in the 1990's. Several studies have shown that the mean sensitivity of the conventional smear ranged from 37% at worst to 73% at best. When sources of errors with the conventional smear were analyzed, it was discovered that sampling and/or preparation errors were responsible for about two-thirds of false negative cases. In those situations, cells were either not collected properly or cells that were collected were not properly transferred to slides. Screening and/or interpretive errors were the cause for the remaining one-third of false negative cases. Abnormal cells were either missed by the cytotechnologist/pathologist or were incorrectly classified because of poor preservation. Due to the problems with conventional techniques liquid-based procedures were developed in which body fluids are collected.

The liquid-based procedures mitigated sampling errors and improved cell preservation. Cell preservation was improved through randomized representation and even distribution of cells with minimization of obscuring material such as inflammation, blood, and debris. With respect to Pap smears, liquid-based procedures are significantly more effective in detecting LGSIL and HGSIL and are as effective as conventional smears in detecting endocervical lesions.

Despite its proven value, the Pap test remains less than optimal. Sensitivity of the Pap test continues to be a subject of concern. False negative and false positive results of various values are reported and inter-observer reproducibility remains less than perfect. The greatest disagreement involves the results interpreted as ASCUS.

It has recently been proposed that HPV testing is of potential value in the screening of cervical cancer precursors. Several studies have shown that a combination of HPV testing and repeated cytologic screening provides reasonable sensitive screening for cervical neoplasia while limiting the use of colposcopic services, which are currently burdened. HPV testing appears to provide an objective assessment of neoplasia risk. A major advantage of this test is its potential for "reflex testing" when used in liquid-based cytology. Reflex testing for HPV is currently recommended by many clinicians and is considered routine in many centers all over the world. HPV-negative patients could be triaged to yearly follow-ups, while HPV-positive patients would require further colposcopic evaluation. Current commercially available HPV tests include the DiGene HPV Test with Hybrid Capture II ("HC2"), Cervista HPV, INFORM HPV in situ hybridization test as well as a variety of molecular HPV DNA assays.

Currently there are several automated screening devices that utilize digital images of specimens for evaluation. Digital pathology is rapidly gaining momentum as a proven and essential technology that assists with reducing laboratory expenses, improving operational efficiency, enhancing productivity, and improving treatment decisions and patient care. It is used worldwide in drug development, reference labs, hospitals, and academic medical center settings.

Digital pathology includes the use of automated screening devices that combine robotics, automated microscopes, high-performance cameras for image capturing and sophisticated computer algorithms for high-speed analysis. Automated screening devices have several advantages including easier location of abnormal and rare cytologic findings as well as coupling automated screening with cytotechnologist skills.

Currently there are two systems approved by the FDA in the United States for automated screening of Pap smears— the FocalPoint Slide Profiler and the ThinPrep® Imaging system.

In 1998, the Food and Drug Administration ("FDA") approved the AutoPap system—the the forerunner of the FocalPoint Slide Profiler—as a system to rank and score Pap smear specimens according to their likelihood of being abnormal. Each specimen is classified into one of two groups: "Review" and "No Further Review". The "Review" specimens are then ranked into five quintiles based on the severity of the abnormality.

The ThinPrep® Imaging system consists of two elements: an image processor and a review scope. Only specially prepared specimens using a synthetic nuclear dye "ThinPrep® Stain" may be used for analysis with this system. Up to 288 slides may be loaded on the system at a time. The image processor identifies 22 microscopic fields, which are reviewed by a cytotechnologist with an automated review scope. Results are then reported as either "normal" or "abnormal", with "abnormal" cases undergoing full glass slide screening for diagnosis.

The impact of digital imaging on routine day-to-day cytology remains far from perfect. Problems with digital imaging for routine cytology is due, in part, to inexperience, poor reproducibility, poor image quality, under representation or under-diagnosis of lesions and the length of time required for capturing images (in addition to the realization that fewer than 5% of women in underdeveloped and developing countries have ever had a Pap test).

Therefore, there is a demand for an improved screening and diagnostic tool used in cytopathology, for example alternative methods to routine Pap tests. The improved screening and diagnostic tool of the present invention satisfies this demand by using digital imaging technology to overcome current limitations with cytologic specimens.

SUMMARY OF THE INVENTION

The present invention is a system and methods for digital evaluation of cellblock ("CB") preparations. Although the present invention is discussed herein with reference to gynecology and specifically cervical cancer, it is contemplated that the present invention is applicable to CB evaluation of any medical specialty such as andrology and any disease such as prostate cancer. More specifically, it is contemplated that the present invention may be applied to CB evaluation of any organ or tissue, for example, urinary tract, breast, thyroid, lymph node, lungs, stomach, bone, skin, kidney, liver, pancreas, eye, and central nervous system, to name a few.

In embodiments discussed with reference to gynecology, digital evaluation of CB preparations of Pap smears is an alternative method to routine and/or liquid based Pap smears. According to the present invention, digitally assisted review of Pap smear CBs is a valid screening/diagnostic tool. More specifically, CB preparations are used from the discarded/residual conventional and liquid-based samples. Digital evaluation of CBs prepared from Pap samples is a feasible method for widespread adoption to achieve high quality specimen preparations providing consistent, reliable and timely diagnosis that may reduce the biopsy load significantly, especially in a resource-poor settings.

In addition to analyzing most cervical cancer precursors, it is contemplated that HPV in situ hybridization ("ISH") and other immunohistochemical ("IHC") testing may be performed on CBs, including evaluation and correlation to clinic-pathological data, without the need for additional testing or sampling.

In one embodiment, the present invention produces cellblock preparations from Pap smear specimens. Specifically, cellblock preparations are sliced and digitized such that computer-assisted diagnosis software may be applied in order to obtain a diagnosis. According to the present invention, each cell within the cellblock preparation is located and ranked according to the level of abnormality and level of suspicion. Automated computer vision techniques are able to prescreen digital images to flag suspicious regions and to discard areas of images that contain clearly healthy tissue. Automated pre-screening alleviates the fatigue faced by professional pathologists, who must often spend hours peering through microscopes. Visual fatigue is known to reduce diagnosis accuracy.

A digital image—otherwise referred to herein as a "virtual slide"—may be archived such as within a repository or database. Numerous digital images further may be organized, searchable, or retrievable such as by any characteristic associated with a particular digital image. It is also contemplated that the images may be posted for accessibility from anywhere. For example, the images may be posted on a cloud computing network such that the images may be viewed, downloaded, or modified, from anywhere in the world. Digital slide images make it possible to consult with expert pathologists remotely and may be better used in education, either in published material or on-line. In one embodiment, the design and optimization of an on-line integrated, automated Internet-based platform assists in the review and analysis of the virtual slides prepared from Pap smears converted into CBs. It is contemplated that an Internet based diagnostic process allows slides prepared from CBs to be reviewed and digitally analyzed, and further allows access to the CBs digital slides remotely.

According to the invention, the Internet-based platform provides accurate, complete, expedited and integrated cytological consultations. It is contemplated that cytotechnologists, pathologists and cytopathologists are able to remotely review, analyze and report their cytologic diagnosis using their own computer without the aid or the need of a microscope or the requirement to be physically located in the laboratory. It is also contemplated that reports may be electronically sent to medical records, physicians and patients in real time through the Internet. In addition, the wide array of computer-assisted image analysis tools are leveraged for diagnosis and quantification of digitized CB slides along with the ancillary studies including ISH for HPV and the different IHC prognostic markers.

In one embodiment, the platform allows human users to access and analyze the digital images. In another embodiment, while human users may access the images, the platform includes computer-assisted diagnosis software that performs the analyses. In this embodiment, the platform may include the design and optimization of a computer-aided image-based scoring algorithm. The algorithm may be suitable for a remote, Internet-based access and review of Pap smears. Internet-based access may be GPS guided such that access is based upon location of the user. The computer-aided image-based scoring algorithm performs analysis through machine learning techniques, for example, techniques to search for highly discriminative visual features that are maximally predictive of cancer and precancer grading.

The computer-aided image-based scoring algorithm may further allow for the automated detection of different histopathologic features of all kinds of cytologic specimens, automated detection of HPV in the specimens, automated detection and quantitation of different prognostic markers such as p53, Ki-67, p16 and automated reporting.

The computer software may further include hierarchical graphical models. Hierarchical graphical models learn the statistical properties of different classes of images by recursively learning visual features of increasing complexity. Features learned in the first layer include only simple linear qualities of the image. Features within the second layer build off of features from the first layer, allowing deeper layers to capture increasingly complex statistical trends in the images. Hierarchical graphical models are closely related to neural networks of which the layer-by-layer learning techniques makes the automated learning of complex image features feasible to identify textural cues in images that are maximally discriminative towards cancer cells.

An object of the present invention is to achieve accurate diagnosis, provide high quality preparations, consistent results, and timely reports.

Another object of the present invention is to provide a highly automated and optimized system and methods for routine cytology, HPV and other prognostic marker detection such as p16, p53 and Ki-67 at a reduced cost.

Another object of the present invention is to provide a system and methods for widespread adoption to achieve accurate diagnosis.

Another object of the present invention is to allow additional tests, such as HPV testing, to be readily available to pathologists with ease and practicality.

Another object of the present invention is to improve the diagnostic accuracy by incorporating histology, IHC and in situ results.

Another object of the present invention is to improved care to patients with cervical cancer and its precursors. Additionally, the automation in the review of digital slides and in recording patient's demographics is easier and more accurate than the conventional manual method.

Another object of the present invention is to provide an Internet-based system that allows interaction between cytotechnologists, pathologists, cytopathologists, consultants, and clinicians. It is recognized that the Internet-based system may be carried out on computer hardware and/or networks.

Another object of the present invention is to provide an Internet-based system including software to direct the analysis of the present invention and allow the remote accessibility to generate diagnostic reports.

These and other aspects, features, and advantages of the present invention will become more readily apparent from the attached drawings and the detailed description of the preferred embodiments, which follow.

DESCRIPTION OF THE DRAWINGS

The invention can be better understood by reading the following detailed description of certain preferred embodiments, reference being made to the accompanying drawings in which.

DETAILED DESCRIPTION OF PREFERRED EMBODIMENTS

Figure 1:
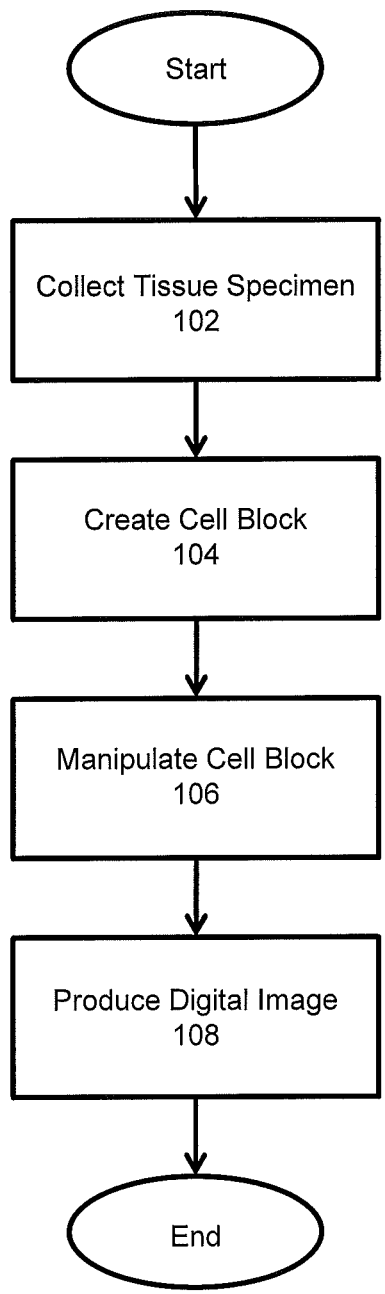
FIG. 1 illustrates a flow chart for creating a digital image of a cellblock preparation according to the invention.

FIG. 1 illustrates a flow chart 100 for creating a digital image of a cellblock preparation. At step 102, a tissue specimen is collected such as a Pap smear sample according to one embodiment of the invention. After collection of the tissue specimen, a cellblock is created at step 104. According to cellblock preparation, cellular materials and/or small tissue fragments are isolated and immobilized such as by centrifugation. The cellblock is then manipulated at step 106. Manipulation of the cellblock may include slicing the cellblock preparation, treating the cellblock preparation, or preforming ancillary testing. It is contemplated that the Pap smear sample may be treated such as with Haematoxylin Eosin ("H&E") staining. Ancillary tests include in situ hybridization ("ISH"), immunohistochemical ("IHC") and Human Papillomavirus ("HPV"). The ISH ancillary test may be used to study low and high risk HPV subtypes. The IHC ancillary test may be used in order to study p16 and other markers such as Ki-67 (MIB-1 clone) and p53, although any marker is contemplated. At step 108, the Pap smear specimen is digitally scanned to obtain a digital image for evaluation. By converting a Pap smear into a tissue section, all issues with image quality are eliminated.

Figure 2:
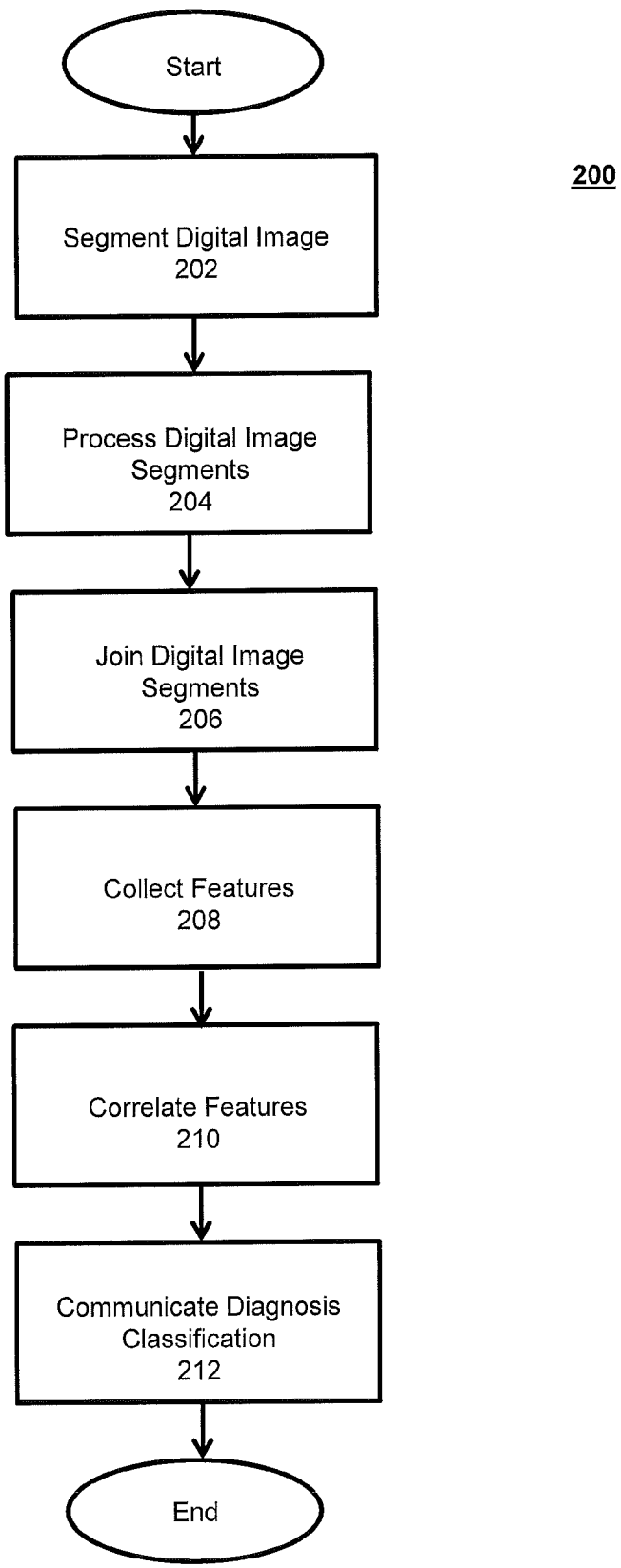
FIG. 2 illustrates a flow chart for evaluating the digital image of a cellblock preparation according to the invention.

FIG. 2 illustrates a flow chart 200 for evaluating the digital image of a cellblock preparation by a computer system, specifically a feature extraction component. The digital image is segmented at step 202 such that each segment may be processed. Since digital images are typically very large, loading the full image into memory of a computer system and processing the image all at once is usually prohibited by the computer system. Therefore, the digital image is segmented such as into square tiles. A single tile typically contains hundreds of cells, although it is contemplated that one or more tiles may contain no cells at all. The square tiles may be bound by pixel size requirements, for example 3000 pixels by 3000 pixels. It is contemplated that each tile may be stored within the computer system as a separate file. Therefore, the files may be analyzed independently of one another, possibly on different computers.

Segmenting the digital image allows segments—or tiles— to be processed simultaneously at step 204 such that all segmented digital images are processed in parallel. Tiles may be processed in parallel using any method as known to those skilled in the art, for example, using multiple cores on the same processor, using multiple processors, or using multiple computers. The tiles overlap by a few hundred pixels to ensure that at least one tile contains a cell in its entirety. The processing step 204 is described in further detail below with respect to FIG. 3.

After each digital image segment or tile is processed at step 204, the digital image segments are joined at step 206 by a classification component of the computer system to obtain a final digital image. The final digital image is an integration of all processes performed on each digital image.

Visual features such as properties of the final digital image are collected at step 208. Visual features include morphological features, textural features, and architectural features described more fully in reference to FIG. 3. The visual features are then correlated to a diagnosis classification at step 212. In one embodiment the diagnosis classification is the Bethesda System for reporting Pap smear results, including for example, Low Grade Squamous Intraepithelial Lesion ("LGSIL") and High Grade Squamous Intraepithelial Lesion ("HGSIL"). The diagnosis classification is communicated at step 212 to a user. The diagnosis may be communicated, for example, through a visual interface such as a display device or auditory interface such as a speaker.

Figure 3:
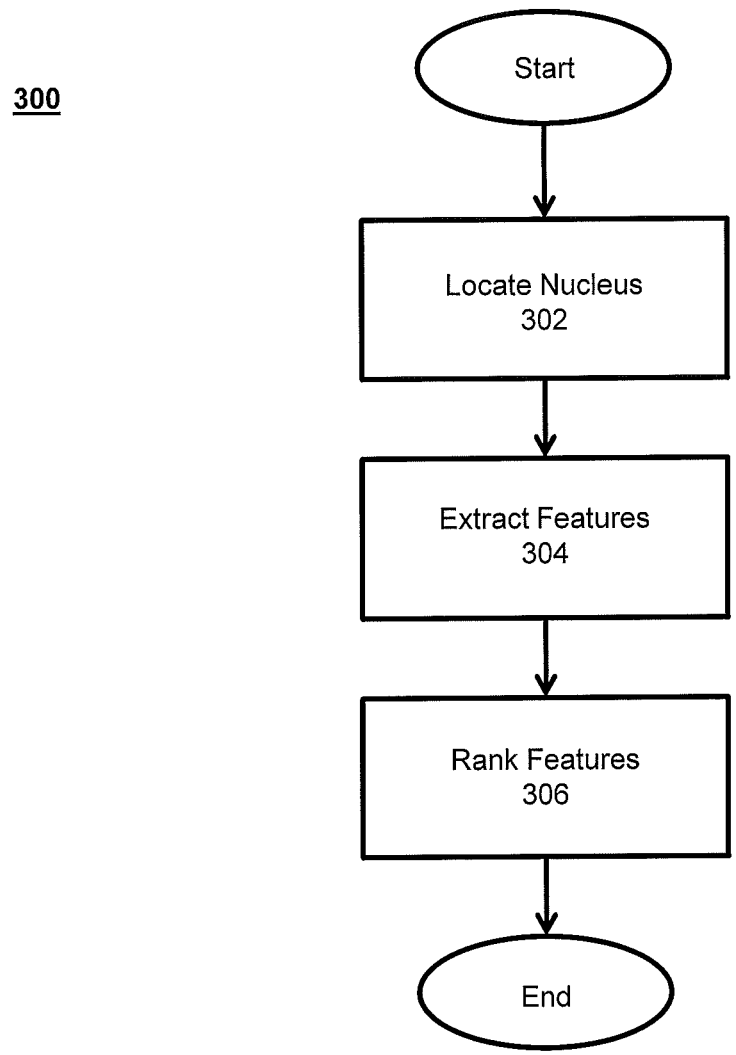
FIG. 3 illustrates a flow chart for processing the digital image of a cellblock preparation according to the invention.

FIG. 3 illustrates a flow chart 300 for processing the digital image of a cellblock preparation according to step 204 of FIG. 2. Specifically, digital image segments or tiles are processed by first locating a nucleus of each cell at step 302. More specifically, the exact location and outline of each cell nucleus is identified. The step 302 of locating a nucleus of a cell within each segmented digital image or tile may further comprise the step of applying a quadratic filter to obtain a filtered image. The quadratic filter begins by mapping (3-dimensions) R G B color space into a higher-dimensional (specifically, 10-dimensions) non-linear color space. In one embodiment, the non-linear color space may be described by: 1, R, G, B, R^2, R*G, R*B, G^2, G*B, B^2. A linear discriminant method, such as the Fischer method, may be used to find a linear combination of features which characterize the nucleus and its surrounding features. The linear discriminant method finds a vector within the color space that best discriminates a cell nucleus from non-nucleus pixels. The advantage of using a linear discriminate method is that it allows nuclei to be located very quickly, while maintaining accuracy. The nuclei outlines of each filtered image may be distinguished, even in the event when two nuclei overlap slightly. As mentioned above, it is contemplated that the analysis of each tile is performed simultaneously such that the tiles are processed in parallel.

One or more visual features of the nucleus are quantified by extracting the features at step 304. The feature extraction component locates each cell in the input image and quantifies roughly a certain number of visual features—such as 100—that describe those cells and their surroundings. Visual features are identified to discriminate healthy from abnormal tissue and to eliminate features that are not effective. The visual features extracted may be grouped into three broad categories: morphological features, textural features, and architectural features. The visual features of the nucleus are ranked at step 306 according to the category into which the feature is grouped. It is also contemplated applying hierarchical graphical models may be applied to learn more complex visual features to discriminate cell types.

Morphological features describe physical properties of cells or the statistics of those properties over groups of cells. These features include the degree of variance of nuclei size and aspects of nuclei shape. Textural features describe low-level visual properties, which, in the case of histologic diagnosis applications, are designed to capture visual qualities including increase in nucleus size and the prominence of nucleoli. These features are measured by the histograms and co-occurrence matrices of pixel colors.

Co-occurrence matrices for quantifying texture properties may be used as known to those skilled in the art. Once the co-occurrence matrix is computed, four types of texture features that are found to be particularly discriminative are computed from the co-occurrence matrix. The texture features include energy, homogeneity, correlation, and contrast. Energy is the sum of the square of elements in the co-occurrence matrix, and describes the total amount of texture variation within the segmented digital image or tile. Homogeneity describes how close the distribution of elements in the co-occurrence matrix is to a diagonal matrix—which may indicate a uniform, textureless pattern in the segmented digital image. Correlation describes how correlated a pixel is to its neighbor over the entire segmented digital image. Contrast is the average intensity contrast between a pixel and its neighbor over the entire segmented digital image.

Textural features capture the first and second order statistics of cellular appearance. Textural properties have an advantage in that they cannot be disturbed by errors that may occur during cell segmentation or other intermediate processing steps. Architectural features describe the spatial arrangement of cells within tissue. For example, if the image is larger than a single tile, then the 20 nearest neighbors of any cell may lie outside the tile boundaries. For this reason, the computation of nearest-neighbor features is performed unless the image is smaller than a single tile.

It is also contemplated that support vector machines ("SVMs") may be used for diagnosis classification based on the quantified features. Specifically, SVMs may be used to predict or learn the relationship between quantified features of each cell and the diagnosis classification. For example, in one embodiment the quantified features of each cell are mapped to a very high-dimensional space such as an infinite dimensional space such that boundaries may be searched to separate healthy cells from unhealthy ones in a way that maximizes the margin between the two cell types.

According to one embodiment of the invention, images—digital images, segmented digital images, and/or final digital images—may be archived within an on-line integrated, automated Internet-based platform. The images may be archived within a database or repository and further may be organized, searchable, or retrievable by any characteristic associated with the digital image. It is also contemplated that the images may be posted for accessibility from anywhere. For example, the images may be posted on a cloud computing network such as within a repository or database so that the images may be viewed, downloaded, or modified, from anywhere in the world.

In one embodiment, the design and optimization of an on-line integrated, automated Internet-based platform assists in the review and analysis of the virtual slides prepared from Pap smears converted into CBs. It is contemplated that an Internet based diagnostic process allows slides prepared from CBs to be reviewed and digitally analyzed, and further allows access to the CBs digital slides remotely.

In one embodiment, the platform allows human users to access and analyze the digital images. The platform may include computer-assisted diagnosis software that performs analyses on the digital images. For example, the platform may include the design and optimization of a computer-aided image-based scoring algorithm. The algorithm may be suitable for a remote, Internet-based access and review of Pap smears. The computer-aided image-based scoring algorithm performs analysis through machine learning techniques, for example, techniques to search for highly discriminative visual features that are maximally predictive of cancer and pre-cancer grading.

Figure 4:
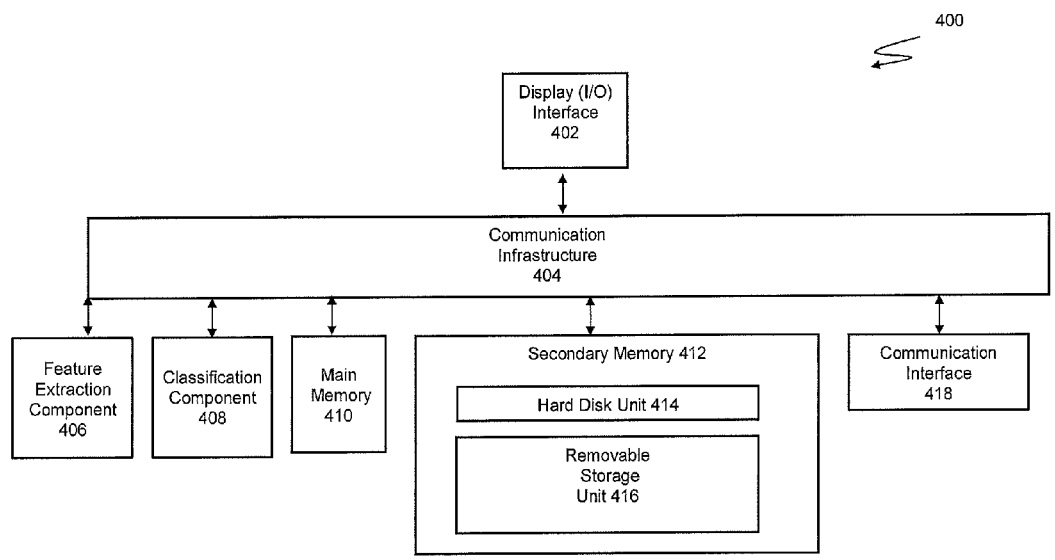
FIG. 4 illustrates an exemplary computer system that may be used to implement the methods according to the invention.

FIG. 4 illustrates an exemplary computer system 400 that may be used to implement the methods according to the invention. One or more computer systems 400 may carry out the methods presented herein.

Computer system 400 includes an input/output display interface 402 connected to communication infrastructure 404—such as a bus—, which forwards data such as graphics, text, and information, from the communication infrastructure 404 or from a frame buffer (not shown) to other components of the computer system 400. The input/output display interface 402 may be, for example, a keyboard, touch screen, joystick, trackball, mouse, monitor, speaker, printer, any other computer peripheral device, or any combination thereof, capable of entering and/or viewing data including the diagnosis classification as communicated to a user.

Computer system 400 includes one or more processors—specifically a feature extraction component 406 and a classification component 408, which may be a special purpose or a general-purpose digital signal processor that processes certain information. Specifically, the feature extraction component 406 receives digital images, segments the digital images, locates a nucleus of a cell within each segmented image, and ranks one or more visual features of the nucleus and the classification component 408 joins all segmented images to obtain a final digital image, collects features of the final digital image, and correlates the features to a diagnosis classification.

Computer system 400 also includes a main memory 410, for example random access memory ("RAM"), read-only memory ("ROM"), mass storage device, or any combination thereof. Computer system 400 may also include a secondary memory 412 such as a hard disk unit 414, a removable storage unit 416, or any combination thereof. Computer system 400 may also include a communication interface 418, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 410, secondary memory 412, communication interface 418, or a combination thereof, function as a computer usable storage medium, otherwise referred to as a computer readable storage medium, to store and/or access computer software including computer instructions. For example, computer programs or other instructions may be loaded into the computer system 400 such as through a removable storage device, for example, a floppy disk, ZIP disks, magnetic tape, portable flash drive, optical disk such as a CD or DVD or Blu-ray, Micro-Electro-Mechanical Systems ("MEMS"), nanotechnological apparatus. Specifically, computer software including computer instructions may be transferred from the removable storage unit 416 or hard disc unit 414 to the secondary memory 412 or through the communication infrastructure 404 to the main memory 410 of the computer system 400.

Communication interface 418 allows software, instructions and data to be transferred between the computer system 400 and external devices or external networks. Software, instructions, and/or data transferred by the communication interface 418 are typically in the form of signals that may be electronic, electromagnetic, optical or other signals capable of being sent and received by the communication interface 418. Signals may be sent and received using wire or cable, fiber optics, a phone line, a cellular phone link, a Radio Frequency ("RF") link, wireless link, or other communication channels.

Computer programs, when executed, enable the computer system 400, particularly the processors—feature extraction component 406 and classification component 408—, to implement the methods of the invention according to computer software including instructions.

The computer system 400 described herein may perform any one of, or any combination of, the steps of any of the methods presented herein. It is also contemplated that the methods according to the invention may be performed automatically, or may be invoked by some form of manual intervention.

The computer system 400 of FIG. 4 is provided only for purposes of illustration, such that the invention is not limited to this specific embodiment. It is appreciated that a person skilled in the relevant art knows how to program and implement the invention using any computer system.

The computer system 400 may be a handheld device and include any small-sized computer device including, for example, a personal digital assistant ("PDA"), smart handheld computing device, cellular telephone, or a laptop or netbook computer, hand held console or MP3 player, tablet, or similar hand held computer device, such as an iPad®, iPad Touch® or Phone®.

Figure 5:
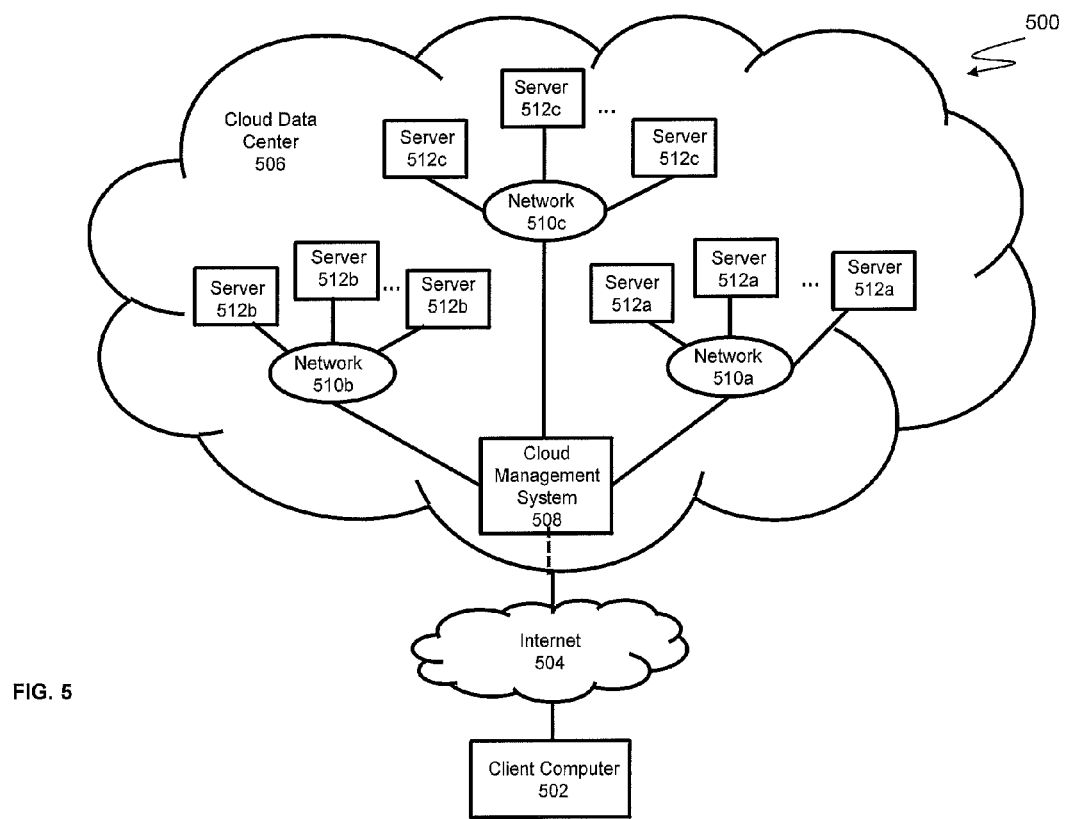
FIG. 5 illustrates an exemplary cloud computing system that may be used to implement the methods according to the present invention.

FIG. 5 illustrates an exemplary cloud computing system 500 that may be used to implement the methods according to the present invention. The cloud computing system 500 includes a plurality of interconnected computing environments. The cloud computing system 500 utilizes the resources from various networks as a collective virtual computer, where the services and applications may run independently from a particular computer or server configuration making hardware less important.

Specifically, the cloud computing system 500 includes at least one client computer 502. The client computer 502 may be any device through the use of which a distributed computing environment may be accessed to perform the methods disclosed herein, for example, a traditional computer, portable computer, mobile phone, personal digital assistant, tablet to name a few. The client computer 502 includes memory such as random access memory ("RAM"), read-only memory ("ROM"), mass storage device, or any combination thereof. The memory functions as a computer usable storage medium, otherwise referred to as a computer readable storage medium, to store and/or access computer software and/or instructions.

The client computer 502 also includes a communications interface, for example, a modem, a network interface (such as an Ethernet card), a communications port, a PCMCIA slot and card, wired or wireless systems, etc. The communications interface allows communication through transferred signals between the client computer 502 and external devices including networks such as the Internet 504 and cloud data center 506. Communication may be implemented using wireless or wired capability such as cable, fiber optics, a phone line, a cellular phone link, radio waves or other communication channels.

The client computer 502 establishes communication with the Internet 504—specifically to one or more servers—to, in turn, establish communication with one or more cloud data centers 506. A cloud data center 506 includes one or more networks 510a, 510b, 510c managed through a cloud management system 508. Each network 510a, 510b, 510c includes resource servers 512a, 512b, 512c, respectively. Servers 512a, 512b, 512c permit access to a collection of computing resources and components that may be invoked to instantiate a virtual machine, process, or other resource for a limited or defined duration. For example, one group of resource servers may host and serve an operating system or components thereof to deliver and instantiate a virtual machine. Another group of resource servers may accept requests to host computing cycles or processor time, to supply a defined level of processing power for a virtual machine. A further group of resource servers may host and serve applications to load on an instantiation of a virtual machine, such as an email client, a browser application, a messaging application, or other applications or software.

The cloud management system 508 may comprise a dedicated or centralized server and/or other software, hardware, and network tools to communicate with one or more networks 510a, 510b, 510c, such as the Internet or other public or private network, with all sets of resource servers 512a, 512b, 512c. The cloud management system 508 may be configured to query and identify the computing resources and components managed by the set of resource servers 512a, 512b, 512c needed and available for use in the cloud data center 506. Specifically, the cloud management system 508 may be configured to identify the hardware resources and components such as type and amount of processing power, type and amount of memory, type and amount of storage, type and amount of network bandwidth and the like, of the set of resource servers 512a, 512b, 512c needed and available for use in the cloud data center 506. Likewise, the cloud management system 508 may be configured to identify the software resources and components, such as type of Operating System ("OS"), application programs, and the like, of the set of resource servers 512a, 512b, 512c needed and available for use in the cloud data center 506.

The present invention is also directed to computer products, otherwise referred to as computer program products, to provide software to the cloud computing system 500. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems ("MEMS"), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 500 of FIG. 5 is provided only for purposes of illustration and does not limit the invention to this specific embodiment. It is appreciated that a person skilled in the relevant art knows how to program and implement the invention using any computer system or network architecture.

While this disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A computer system method for evaluation of cellblock preparations, comprising the steps of:
   producing digitally a treated Pap smear sample to obtain a digital image;
   segmenting the digital image to obtain a plurality of segmented digital images;
   processing each segmented digital image of the plurality, wherein said processing step further comprises the steps of:
      locating a nucleus of a cell within each segmented digital image, wherein said locating step further comprises the step of determining an outline of the nucleus of the cell;
      extracting one or more visual features of the nucleus, and
      ranking the one or more visual features of the nucleus based on a level of abnormality and a level of suspicion to obtain one or more quantified features within each segmented digital image;
   joining all segmented digital images to obtain a final digital image;
   collecting all quantified features of the final digital image to obtain a collection of quantified features;
   correlating the collection of quantified features to a diagnosis classification; and
   communicating the diagnosis classification.

2. The computer system method for evaluation of cellblock preparations according to claim 1, wherein each segmented digital image of the plurality is a tile.

3. The computer system method for evaluation of cellblock preparations according to claim 1, wherein said ranking step further comprises the step of applying a scoring algorithm to obtain the one or more quantified features.

4. The computer system method for evaluation of cellblock preparations according to claim 1 further comprising the step of archiving within a database one or more of the following: the digital image, the segmented digital image, the final digital image.

5. The computer system method for evaluation of cellblock preparations according to claim 4, wherein the database is located on a cloud computing network.

6. The computer system method for evaluation of cellblock preparations according to claim 1, wherein the one or more visual feature of the nucleus is at least one selected from the group comprising of: a morphological feature including nuclei size and nuclei shape, a textural feature including nucleus size and nucleoli, and an architectural feature including a spatial arrangement of the cell.

7. The computer system method for evaluation of cellblock preparations according to claim 1, wherein the step of locating a nucleus of a cell within each segmented digital image further comprises the step of applying a quadratic filter to the segmented digital image.

8. The computer system method for evaluation of cellblock preparations according to claim 1, wherein said processing step of each segmented digital image of the plurality is performed simultaneously such that all segmented digital images are processed in parallel.

9. The computer system method for evaluation of cellblock preparations according to claim 1, wherein the diagnosis classification is determined by one or more support vector machines.

10. A system for evaluation of cellblock preparations, comprising:
   a processor configured to receive a digital Pap smear image, segment the digital Pap smear image to obtain a plurality of segmented images, locate a nucleus of a cell including an outline of the nucleus within each segmented image and ranks one or more visual features of the nucleus based on a level of abnormality and a level of suspicion to obtain one or more quantified features within each segmented image; and
   the processor further configured to join all segmented images to obtain a final digital image, collect the one or more quantified features of the final digital image to obtain a collection of quantified features, and correlate the collection of quantified features to a diagnosis classification in order to communicate the diagnosis classification.

11. The system for evaluation of cellblock preparations according to claim 10 further comprising a database for archiving one or more of the following: the digital Pap smear image, the segmented image, the final digital image.

12. The system for evaluation of cellblock preparations according to claim 11, wherein the database is located on a cloud computing network.

13. The system for evaluation of cellblock preparations according to claim 10, wherein the one or more quantified features is at least one selected from the group comprising of: a morphological feature including nuclei size and nuclei shape, a textural feature including nucleus size and nucleoli, and an architectural feature including a spatial arrangement of the cell.

14. The system for evaluation of cellblock preparations according to claim 13, wherein the morphological feature includes a degree of variance of nucleus size and nucleus shape.

15. The system for evaluation of cellblock preparations according to claim 13, wherein the textural feature includes a measurement by the histograms and co-occurrence matrices of pixel colors.

16. The system for evaluation of cellblock preparations according to claim 13, wherein the architectural feature includes the spatial arrangement of cells within the digital Pap smear image.

17. The system for evaluation of cellblock preparations according to claim 10, wherein said processor utilizes a quadratic filter to locate a nucleus of a cell within the segmented image.

18. The system for evaluation of cellblock preparations according to claim 10, wherein said processor simultaneously processes in parallel each segmented image.

19. The system for evaluation of cellblock preparations according to claim 10, further comprising a support vector machine to determine the diagnosis classification.

20. The system for evaluation of cellblock preparations according to claim 19, wherein the diagnosis classification is the Bethesda System.

* * * * *